United States Patent
Yokoyama et al.

(10) Patent No.: US 11,084,891 B2
(45) Date of Patent: Aug. 10, 2021

(54) PHOTOCURABLE RESIN COMPOSITION, INK AND COATING MATERIAL

(71) Applicant: OSAKA SODA CO., LTD., Osaka (JP)

(72) Inventors: Katsutoshi Yokoyama, Osaka (JP); Shinichiro Ohashi, Osaka (JP); Satoshi Inoue, Osaka (JP)

(73) Assignee: Osaka Soda Co., Ltd., Osaka (JP)

( * ) Notice: Subject to any disclaimer, the term of this patent is extended or adjusted under 35 U.S.C. 154(b) by 0 days.

(21) Appl. No.: 16/204,757

(22) Filed: Nov. 29, 2018

(65) Prior Publication Data

US 2019/0135955 A1  May 9, 2019

Related U.S. Application Data

(63) Continuation of application No. 15/517,850, filed as application No. PCT/JP2016/052373 on Jan. 27, 2016, now abandoned.

(30) Foreign Application Priority Data

Feb. 3, 2015 (JP) .................................. 2015-019429

(51) Int. Cl.
| | |
|---|---|
| C08F 20/40 | (2006.01) |
| C08F 2/44 | (2006.01) |
| C09D 11/101 | (2014.01) |
| C09D 11/106 | (2014.01) |
| C09D 131/06 | (2006.01) |
| C08F 122/26 | (2006.01) |
| C09D 4/06 | (2006.01) |
| C08F 120/40 | (2006.01) |
| C08F 118/16 | (2006.01) |
| C08F 2/48 | (2006.01) |
| C09D 129/06 | (2006.01) |

(52) U.S. Cl.
CPC ............... *C08F 20/40* (2013.01); *C08F 2/44* (2013.01); *C08F 2/48* (2013.01); *C08F 118/16* (2013.01); *C08F 120/40* (2013.01); *C08F 122/26* (2013.01); *C09D 4/06* (2013.01); *C09D 11/101* (2013.01); *C09D 11/106* (2013.01); *C09D 129/06* (2013.01); *C09D 131/06* (2013.01)

(58) Field of Classification Search
CPC .... C08F 2/44; C08F 2/48; C08F 20/40; C08F 118/16; C08F 120/40; C08F 122/26; C09D 4/06; C09D 11/101; C09D 11/106; C09D 129/06; C09D 131/06

See application file for complete search history.

(56) References Cited

U.S. PATENT DOCUMENTS

| | | | | | |
|---|---|---|---|---|---|
| 3,551,311 | A | * | 12/1970 | Nass | ........................ C08J 7/043 |
| | | | | | 428/458 |
| 3,552,986 | A | * | 1/1971 | Nass | ..................... C08F 291/00 |
| | | | | | 427/500 |
| 2012/0123014 | A1 | * | 5/2012 | Chretien | ................. G03G 15/20 |
| | | | | | 522/182 |
| 2016/0145392 | A1 | | 5/2016 | Toda et al. | |

FOREIGN PATENT DOCUMENTS

| | | |
|---|---|---|
| JP | 52-004310 | 1/1977 |
| JP | 58-103519 | 6/1983 |
| JP | 1-131223 | 5/1989 |
| JP | 2-077414 | 3/1990 |
| JP | 2006-219525 | 8/2006 |
| JP | 2007056187 A * | 3/2007 |
| JP | 2010-189537 | 9/2010 |
| JP | 2012-046612 | 3/2012 |
| JP | 2012-116868 | 6/2012 |
| JP | 2013-124218 | 6/2016 |
| WO | 2014/203779 | 12/2014 |

OTHER PUBLICATIONS

Takayama, et al., "Studies on Resins of UV Curable Lithographic Inks", Journal of Photopolymer Science and Technology, vol. 2, No. 2, 1989, pp. 211-216.

* cited by examiner

*Primary Examiner* — Sanza L. McClendon
(74) *Attorney, Agent, or Firm* — Hamre, Schumann, Mueller & Larson, P.C.

(57) ABSTRACT

Provided is a photocurable resin composition containing an allylic polymer (A) which has excellent adhesion to plastic substrates. The present invention relates to a photocurable resin composition containing an allylic polymer (A), the allylic polymer (A) being produced by polymerization of an allylic compound represented by the following formula (I):

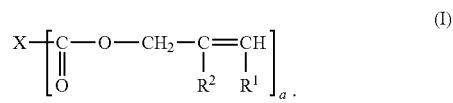

(I)

4 Claims, No Drawings

PHOTOCURABLE RESIN COMPOSITION, INK AND COATING MATERIAL

TECHNICAL FIELD

The present invention relates to a photocurable resin composition containing an allylic polymer (A) and also relates to an ink and a coating material including the resin composition. Specifically, the present invention relates to a photocurable resin composition having excellent adhesion to plastic substrates.

BACKGROUND ART

Various resin compositions that can be cured by light (e.g. ultraviolet rays) have been used in inks, coating materials, adhesives, photoresists, and other applications. For example, UV curable printing inks are highly valued because, e.g., they have a high cure rate so that they can be cured in a short time; they are environmentally friendly due to no use of solvents; and they can save resources and energy. Therefore, they are increasingly widely used in practice.

Among such resin compositions, those containing diallyl phthalate resins derived from diallyl phthalate (diallyl orthophthalate, diallyl isophthalate, or diallyl terephthalate) are used as UV offset inks for paper.

However, in offset ink applications, the incorporation of diallyl phthalate resins is known to result in insufficient adhesion to plastic substrates (see, for example, Patent Literature 1). Moreover, Patent Literature 2 describes an active energy ray-curable resin composition that contains a diallyl hydrogenated phthalate prepolymer with an alkyl group on the benzene ring, methyl(meth)acrylate, and other additives, but does not mention anything about adhesion to plastic substrates. These days, products of various types of plastic materials, including polyethylene terephthalate (PET) and polypropylene (PP), are on the market. Thus, there is a need to improve adhesion to plastic substrates with which diallyl phthalate resins have problems.

CITATION LIST

Patent Literature

Patent Literature 1: JP S52-4310 A
Patent Literature 2: JP H02-77414 A

SUMMARY OF INVENTION

Technical Problem

The present invention aims to provide a photocurable resin composition containing an allylic polymer (A) which has excellent adhesion to plastic substrates.

Solution to Problem

As a result of extensive studies, the present inventors have found that a photocurable resin composition containing an allylic polymer (A) produced by polymerization of an allylic compound having a specific structure has excellent adhesion to plastic substrates, thereby achieving the present invention.

Specifically, the photocurable resin composition of the present invention contains an allylic polymer (A), the allylic polymer (A) being produced by polymerization of an allylic compound represented by the following formula (I):

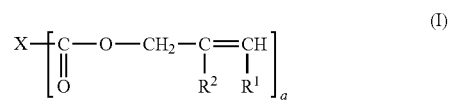

wherein $R^1$ and $R^2$ each represent H or $CH_3$; X represents an a-valent group having an unsubstituted saturated or partially unsaturated four- to eight-membered cyclic structure; and a represents 2 or 3.

A photocurable resin composition containing an allylic polymer (A) produced by polymerization of an allylic compound of formula (I) has excellent adhesion to plastic substrates and excellent drying properties.

Moreover, such a photocurable resin composition shows excellent adhesion particularly to polypropylene (PP) resin. Thus, it is suitable as a component of inks or coating materials for PP resin, to which conventional diallyl phthalate resin compositions are difficult to closely adhere.

In the photocurable resin composition of the present invention, the X in formula (I) preferably has any of the following cyclic structures:

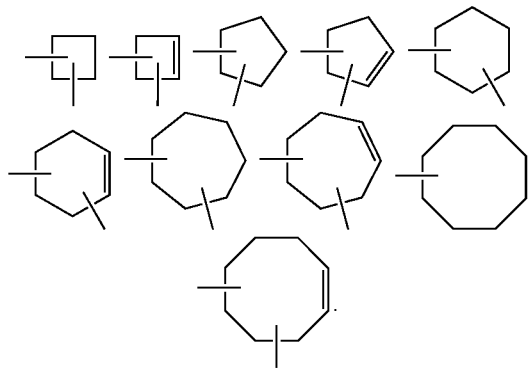

Preferably, the photocurable resin composition of the present invention further contains an ethylenically unsaturated compound (B).

The use of an ethylenically unsaturated compound improves the drying properties of the photocurable resin composition and can adjust the viscosity to a level appropriate for printing, thereby allowing the composition to have excellent coating workability.

Preferably, the photocurable resin composition of the present invention further contains a photopolymerization initiator.

The composition containing a photopolymerization initiator can be smoothly polymerized by exposure to light, so that a higher molecular weight polymer can be produced in a short time.

The ink of the present invention includes the photocurable resin composition of the present invention.

This ink is suitable for printing on plastic substrates, and especially on PP resin substrates (e.g. sheets or films).

The coating material of the present invention includes the photocurable resin composition of the present invention.

This coating material is suitable for painting on plastic substrates, and especially on PP resin substrates (e.g. sheets or films).

The coating material of the present invention is preferably an overprint varnish.

Advantageous Effects of Invention

The present invention provides a photocurable resin composition which has excellent adhesion to synthetic polymer substrates, particularly plastic substrates, when it is used as a component of inks, coating materials, adhesives, or photoresists.

DESCRIPTION OF EMBODIMENTS

The present invention is described in detail below.

Allylic polymer (A)

The photocurable resin composition of the present invention contains an allylic polymer (A) produced by polymerization of an allylic compound represented by the following formula (I):

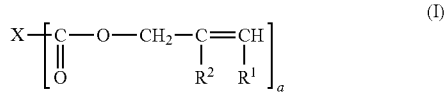

wherein $R^1$ and $R^2$ each represent H or $CH_3$; X represents an a-valent group having an unsubstituted saturated or partially unsaturated four- to eight-membered cyclic structure; and a represents 2 or 3.

Preferred examples of X in formula (I) include those having the following cyclic structures:

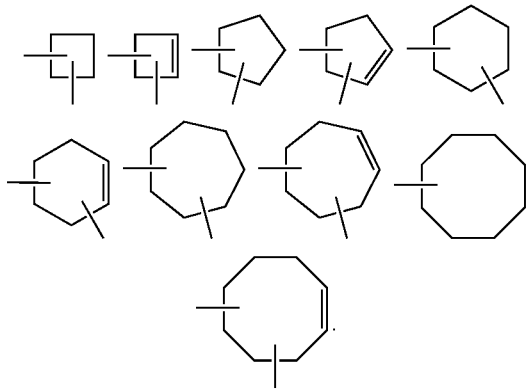

More preferred examples of X in formula (I), include those having the following cyclic structures:

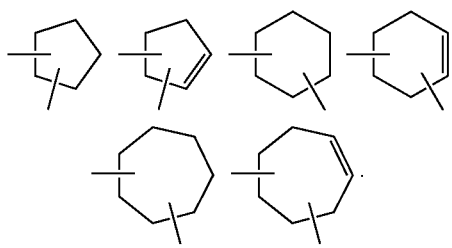

Further more preferred examples of X in formula (I) include those having the following cyclic structures:

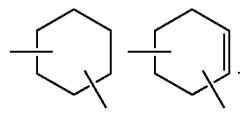

The X may be of various types and may have a cyclic structure other than those mentioned above. When X has a partially unsaturated cyclic structure, the number of double bonds in the cyclic structure is not limited to one, and may be two or more. However, X does not have an aromatic six-membered cyclic structure.

The X may be intramolecularly crosslinked. Examples of the intramolecularly crosslinked X include adamantane, norbornene, and norbornane.

Since X is an a-valent group where a is 2 or 3, X is a bivalent or trivalent group. A number "a (2 or 3)" of allyl ester groups [—CO—O—$CH_2$—$CR^2$=$CHR^1$] shown in formula (I) are bound to the cyclic structure of X.

Any combination of the positions of the allyl ester groups [—CO—O—$CH_2$—$CR^2$=$CHR^1$] substituted on the ring of X can be used. The allylic compound may be a mixture of compounds that differ in the combination of substitution positions. Particularly when two allyl ester groups are bound to a six-membered X, the two allyl ester groups may be in the ortho, meta, or para orientation, preferably in the ortho or para orientation.

Specific examples of the allylic compound of formula (I) include diallyl 1,2-cyclohexanedicarboxylate, diallyl 1,3-cyclohexanedicarboxylate, diallyl 1,4-cyclohexanedicarboxylate, diallyl 4-cyclohexene-1,2-dicarboxylate, and diallyl 2-cyclohexene-1,2-dicarboxylate. Preferred of these are diallyl 1,2-cyclohexanedicarboxylate, diallyl 4-cyclohexene-1,2-dicarboxylate, and diallyl 1,4-cyclohexanedicarboxylate, with diallyl 1,2-cyclohexanedicarboxylate being more preferred.

An allylic polymer (A) produced by polymerization of at least one compound selected from the group consisting of the aforementioned allylic compounds may be used in the photocurable resin composition. Moreover, copolymers produced by copolymerization of the allylic compound of formula (I) and other polymerizable compounds may be used in the photocurable resin composition.

The specific exemplary allylic compounds of formula (I) may be produced, for example, by an esterification reaction between cyclohexanedicarboxylic acid or cyclohexanedicarboxylic anhydride and allyl alcohol or allyl chloride, or an esterification reaction between cyclohexenedicarboxylic acid or cyclohexenedicarboxylic anhydride and allyl alcohol or allyl chloride.

Commercial products of the specific exemplary allylic compounds of formula (I) may also be used.

The allylic compound of formula (I) may be polymerized by any method, including usual polymerization reactions. An appropriate polymerization initiator, if needed, may be added in the polymerization reaction. The use of a polymerization initiator allows for production of a higher molecular weight polymer in a short time.

Examples of the polymerization initiator used in the polymerization reaction of the allylic compound include azo initiators such as azobisisobutyronitrile and dimethyl 2,2'-azobisisobutyrate; peroxide initiators such as ketone peroxides, peroxy ketals, hydroperoxides, dialkyl peroxides, diacyl peroxides, peroxy dicarbonates, peroxy esters, and benzoyl peroxide; and photopolymerization initiators, including: acetophenone initiators such as 2-methyl-1-[4-(methylthio)phenyl]-2-morpholinopropane-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the polymerization initiator relative to 100 parts by weight of the allylic compound of formula (I) as a monomer is preferably 5.0 parts by weight or less, more preferably 3.0 parts by weight or less. Moreover, the amount is particularly preferably 0.001 to 3.0 parts by weight.

The reaction temperature during the polymerization is preferably 60 to 240° C., e.g. 80 to 220° C. The reaction time is preferably 0.1 to 100 hours, e.g. 1 to 30 hours.

An allylic polymer (A) having a monomer unit based on the allylic compound of formula (I) can be prepared by polymerization of the allylic compound of formula (I) as described above or by other methods.

The amount of the monomer unit based on the allylic compound of formula (I), based on 100% by weight of the allylic polymer (A), is preferably 20% by weight or more, more preferably 50% by weight or more, further more preferably 80% by weight or more, particularly preferably 98% by weight or more, and may be 100% by weight.

The allylic polymer (A) preferably has a weight average molecular weight of 300,000 or less, more preferably 200,000 or less. The weight average molecular weight is further more preferably 2,000 to 150,000, particularly preferably 5,000 to 140,000.

The amount of the allylic polymer (A) in the photocurable resin composition of the present invention is preferably 1% to 60% by weight, more preferably 1% to 55% by weight, further more preferably 1% to 50% by weight of the total amount of the photocurable resin composition. The lower limit of the amount is particularly preferably 20% by weight. The allylic polymer (A) in an amount of more than 60% by weight may have a lower solubility in an ethylenically unsaturated compound (B) and a higher viscosity leading to poor handleability. The allylic polymer (A) in an amount of less than 1% by weight may not allow the resulting photocurable resin composition to have sufficient drying properties.

Ethylenically Unsaturated Compound (B)

The photocurable resin composition of the present invention preferably contains an ethylenically unsaturated compound (B) that can be cured by exposure to light. The ethylenically unsaturated compound (B) preferably has 1 to 20, more preferably 1 to 10, further more preferably 2 to 6 carbon-carbon double bonds. The ethylenically unsaturated compound (B) may be, for example, a (meth)acrylic acid ester compound, a (meth)allyl compound, or a vinyl compound. Also, the ethylenically unsaturated compound may be a mixture of two or more compounds.

Examples of the (meth)acrylic acid ester compound include (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds; (meth)acrylic acid ester compounds of alkylene oxide (e.g. ethylene oxide, propylene oxide) adducts of bisphenols such as bisphenol A or bisphenol F; (meth)acrylic acid ester compounds such as epoxy (meth)acrylate, urethane (meth)acrylate, and alkyd (meth)acrylate; and (meth)acrylic acid ester compounds such as epoxidized soybean oil acrylate. Preferred are (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds. More preferred are (meth)acrylic acid ester compounds of alcohols such as pentaerythritol, dipentaerythritol, trimethylolpropane, or ditrimethylolpropane, and alkylene oxide (e.g. ethylene oxide, propylene oxide) adducts of these (meth)acrylic acid ester compounds.

Examples of the (meth)allyl compound include di(meth)allyl phthalate and tri(meth)allyl isocyanurate.

Examples of the vinyl compound include styrene, divinylbenzene, N-vinylpyrrolidone, and vinyl acetate.

In view of compatibility with the allylic polymer (A) and curability in photo-curing, ditrimethylolpropane tetraacrylate or trimethylolpropane triacrylate is preferred among these, with ditrimethylolpropane tetraacrylate being more preferred.

The amount of the ethylenically unsaturated compound (B) contained in the photocurable resin composition of the present invention is preferably 50 to 400 parts by weight, more preferably 50 to 300 parts by weight, furthermore preferably 50 to 250 parts by weight, relative to 100 parts by weight of the allylic polymer (A) in the photocurable resin composition.

The ratio by weight of the allylic polymer (A) to the ethylenically unsaturated compound (B) (allylic polymer: ethylenically unsaturated compound) in the photocurable resin composition of the present invention may be in the range of 10:90 to 90:10, preferably 20:80 to 80:20, more preferably 30:70 to 50:50. When the ratio is within the range indicated above, the photocurable resin composition can easily show sufficient adhesion to plastic substrates.

Other Additives

The photocurable resin composition of the present invention may contain a polymerization initiator, and in particular preferably a photopolymerization initiator. Examples of photopolymerization initiators that may be contained in the photocurable resin composition include acetophenone initiators such as 2-methyl-1-[4-(methylthio)phenyl]-2-morpholinopropane-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the photopolymerization initiator contained in the photocurable resin composition is preferably in the range of 0.1% to 15% by weight, more preferably 0.5% to 12% by weight, further more preferably 1% to 10% by weight of the total photocurable resin composition.

A photoinitiation aid (e.g. an amine photoinitiation aid such as triethanolamine) may be used in combination in the photocurable resin composition.

The amount of the photoinitiation aid is preferably in the range of 0.1% to 5% by weight, more preferably 0.5% to 3% by weight of the total photocurable resin composition.

The photocurable resin composition of the present invention may contain various additives depending on the purpose, and examples of the additives include stabilizers (e.g. polymerization inhibitors such as hydroquinone and methoquinone), coloring agents such as pigments (e.g. cyanine blue, disazo yellow, carmine 6b, lake red C, carbon black, titanium white), fillers, and viscosity modifiers. The amount of the stabilizer contained in the photocurable resin composition is preferably in the range of 0.01% to 2% by weight, more preferably 0.1% to 1% by weight of the total photocurable resin composition.

The amount of the coloring agent is preferably in the range of 1% to 50% by weight, more preferably 1% to 45% by weight of the total photocurable resin composition.

The photocurable resin composition of the present invention can be prepared by mixing an allylic polymer (A) and optionally an ethylenically unsaturated compound (B) as well as a photopolymerization initiator, a photoinitiation aid, and additives (e.g. a stabilizer, a pigment). The photocurable resin composition of the present invention is cured by exposure to light. The light used in the curing is typically ultraviolet rays.

The curing reaction of the photocurable resin composition may be carried out with any curing apparatus under any curing condition, and methods commonly used for photocuring reactions may be used.

The photocurable resin composition of the present invention can be used in any application. It may be used in various technical fields, such as inks (e.g. printing inks such as photocurable printing inks for lithography, silk screen printing inks, and gravure inks), coating materials (e.g. coating materials for paper, plastics, metals, wood, or other substrates, such as overprint varnishes), adhesives, and photoresists.

An ink including the photocurable resin composition of the present invention is the ink of the present invention. A coating material including the photocurable resin composition of the present invention is the coating material of the present invention. The coating material of the present invention is preferably an overprint varnish.

For example, the ink may typically be produced as follows. An allylic polymer (A) and a stabilizer or the like are dissolved in an ethylenically unsaturated compound (B) with stirring at 60° C. to 100° C. to prepare a varnish. The varnish is mixed with a pigment, a photopolymerization initiator, and other additives with stirring in a butterfly mixer and then milled using, for example, a three-roll mill to obtain an ink.

An overprint varnish can be produced in the same manner as described for the ink with the exception of not using any pigment.

EXAMPLES

The present invention is described in greater detail below referring to, but not limited to, examples.

Measurement of Weight Average Molecular Weight (Mw) and Molecular Weight Distribution (Mw/Mn) of Allylic Polymers Weight average molecular weight (Mw) and molecular weight distribution (Mw/Mn) were measured by GPC. The Mw and Mn are a weight average molecular weight and number average molecular weight, respectively, relative to polystyrene standards. Column: Shodex KF-806L, KF-804, KF-803, KF-802, and KF-801 connected in series
Flow rate: 1.0 mL/min
Temperature: 40° C.
Detection: RID-6A
Sample: A measurement sample was prepared by dissolving 20 mg of a sample in 10 mL of tetrahydrofuran.

Production Example 1: Synthesis of Diallyl 1,2-cyclohexanedicarboxylate Polymer

Diallyl 1,2-cyclohexanedicarboxylate was prepared by an esterification reaction between cyclohexanedicarboxylic anhydride and allyl alcohol.

To a 3 L separable flask were added 2,400 g of diallyl 1,2-cyclohexanedicarboxylate and 60 g of benzoyl peroxide, followed by stirring with heat at 80° C. After 2.5 hours of reaction, the reaction mixture was cooled to 30° C. After the cooling, methanol was added to the flask to precipitate a polymer. The polymer was dried under reduced pressure at 40° C. for 16 hours to obtain Polymer 1 (amount produced: 408 g, yield: 17%, Mw=32,000, Mw/Mn=2.8), which was then used in Example 1.

Production Examples 2 to 4: Synthesis of Diallyl 1,2-cyclohexanedicarboxylate Polymer Diallyl 1,2-cyclohexanedicarboxylate polymers were synthesized under the same polymerization conditions as in Production Example 1, except that the polymerization time was changed. The polymer produced in Production Example 2 (amount produced: 612 g, yield: 25.5%, Mw=63,000, Mw/Mn=4.7) was used as Polymer 2 in Examples 2 and 5. The polymer produced in Production Example 3 (amount produced: 672 g, yield: 28%, Mw=89,000, Mw/Mn=6.9) was used as Polymer 3 in Example 3. The polymer produced in Production Example 4 (amount produced: 720 g, yield: 30%, Mw=140,000, Mw/Mn=5.4) was used as Polymer 4 in Example 4.

Production Example 5: Synthesis of 1,2-cis-diallyl-3-methyl-hexahydrophthalate Polymer or 1,2-cis-diallyl-4-methyl-hexahydrophthalate Polymer In accordance with the synthesis method described in JP 2012-116868 A, a 1,2-cis-diallyl-3-methyl-hexahydrophthalate polymer or a 1,2-cis-diallyl-4-methyl-hexahydrophthalate polymer was synthesized as Polymer 5 (amount produced: 624 g, yield: 26%, Mw=50,000, Mw/Mn=3.8), which was then used in Comparative Examples 2 and 3.

Examples 1 to 5 and Comparative Examples 1 to 3

Photocurable resin compositions with the formulations described in Table 1 were prepared and evaluated for their properties.

1) Evaluation of Solubility of Photocurable Resin Compositions

Polymers 1 to 5 produced in Production Examples 1 to 5 or DAP resin, ethylenic compounds, and polymerization initiators were added in the formulation amounts indicated in Table 1 and mixed with heat at 100° C. to prepare photocurable resin compositions. The photocurable resin compositions were cooled to room temperature and then allowed to stand overnight. Thereafter, the appearance of each composition was evaluated for transparency to determine the solubility. The compositions having a transparent appearance after cooling were rated as "Good", and those having a cloudy appearance were rated as "Poor". Table 2 shows the results.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Polymer 1 | 40 | — | — | — | — | — | — | — |
| Polymer 2 | — | 40 | — | — | 30 | — | — | — |
| Polymer 3 | — | — | 40 | — | — | — | — | — |
| Polymer 4 | — | — | — | 40 | — | — | — | — |
| Polymer 5 | — | — | — | — | — | — | 15 | 30 |
| DAP resin | — | — | — | — | — | 30 | 15 | — |
| DTMPA | 60 | 60 | 60 | 60 | 70 | 70 | — | — |
| DPHA | — | — | — | — | — | — | 70 | — |
| 3EO-TMPTA | — | — | — | — | — | — | — | 70 |
| Irgacure 907 | 10 | 10 | 10 | 10 | 10 | 10 | 10 | 10 |
| Irganox 1076 | 0.3 | 0.3 | 0.3 | 0.3 | 0.3 | 0.3 | 0.3 | 0.3 |

The components other than Polymers 1 to 5 listed in Table 1 are described below.
The formulation amounts indicated in Table 1 are expressed in parts by weight.
DAP resin: diallyl phthalate resin available from Osaka Soda Co., Ltd.
DTMPTA: SR355, ditrimethylolpropane tetraacrylate, available from Sartomer
DPHA: ARONIX M-404, dipentaerythritol hexaacrylate, available from Toagosei Co., Ltd.
3EO-TMPTA: NK ester A-TMPT-3EO, ethylene oxide-modified trimethylolpropane triacrylate, available from Shin-Nakamura Chemical Co., Ltd.
Irgacure 907: 2-methyl-l-[4-(methylthio)phenyl]-2-morpholinopropane-l-one available from BASF Japan
Irganox 1076: octadecyl-3-(3,5-di-t-butyl-4-hydroxyphenyl)propionate available from BASF Japan 2) Viscosity The viscosity of the photocurable resin compositions was measured at 30° C. using a Brookfield viscometer DV-II+ Pro. Table 2 shows the results.

3) Drying Properties

The drying properties of the photocurable resin compositions were evaluated based on tack-free conveyor speed (m/min). Table 2 shows the results.

A higher value indicates better drying properties.

4) Adhesion Test

The photocurable resin compositions were each applied to two types of plastic substrates, i.e., a polypropylene substrate (highly transparent cast PP sheet available from Tatsuta Chemical Co., Ltd., trade name: High P Crystal ST-500, thickness: 0.3 mm) and a polypropylene substrate (highly transparent cast PP sheet available from Idemitsu Unitech Co., Ltd., trade name: SUPERPURELAY SG-140TC, thickness: 0.3 mm), using a No. 2 bar coater. Then, each of the coated films was cured using a metal halide lamp with an output of 60 W/cm (irradiation distance: 10 cm) at a conveyor speed at which the coated film became tack-free. The UV curing apparatus used was a conveyor-type UV curing apparatus available from Eye Graphics Co., Ltd. An 18 mm width strip of Cellotape (registered trademark) (Nichiban Co., Ltd., product No. LP-18, adhesive force: 4.01 N/10 mm) was attached to the resulting coated films. After strong rubbing with a thumb for 30 seconds or longer, the Cellotape (registered trademark) strip was peeled gradually and then rapidly to evaluate the degree of detachment of the coated films. The evaluation criteria are described below. Table 2 shows the results.

5: The coated film was not detached by rapid peeling.
4: The coated film was not detached at all by gradual peeling but was slightly detached by rapid peeling.
3: The coated film was not detached at all by gradual peeling but was detached by rapid peeling.
2: Approximately 50% of the coated film was detached even by gradual peeling.
1: The coated film was detached even by gradual peeling.

5) Curability Test

The photocurable resin compositions were coated on a slide glass (Matsunami Glass Ind., Ltd., S9213, standard large soda-lime glass, ground edges, t1.3) and then cured using a metal halide lamp with an output of 60 W/cm (irradiation distance: 10 cm). The pencil hardness of the cured products was measured using a hand push pencil scratch hardness tester available from Yasuda Seiki Seisakusho, Ltd. in accordance with JIS K 5600. Table 2 shows the results.

TABLE 2

|  | Example 1 | Example 2 | Example 3 | Example 4 | Example 5 | Comparative Example 1 | Comparative Example 2 | Comparative Example 3 |
|---|---|---|---|---|---|---|---|---|
| Solubility | Good | Good | Good | Good | Good | Good | Good | Good |
| Viscosity (Pa · s) | 97 | 170 | 184 | 230 | 30 | 65 | 353 | 0.3 |
| Drying properties (m/min) | 60 | 70 | 70 | 70 | 60 | 75 | 100 or more | 40 |
| Adhesion (PP sheet ST-500) | 5 | 5 | 5 | 5 | 5 | 1 | not applicable | 3 |
| Adhesion (PP sheet SG-140TC) | 5 | 5 | 5 | 5 | 5 | 1 | — | 3 |
| Curability (pencil hardness) | 2B | 2B | 2B | 2B | B | B | — | F |

As shown from the results of Examples 1 to 5, the photocurable resin compositions prepared from Polymers 1 to 4, each of which corresponds to an allylic polymer (A) produced by polymerization of an allylic compound of formula (I), had drying properties equivalent to a photocurable resin composition prepared from a diallyl phthalate resin, such as Comparative Example 1. They also exhibited excellent adhesion to polypropylene sheets to which the photocurable resin composition of Comparative Example 1 prepared from a diallyl phthalate resin was difficult to adhere.

The photocurable resin composition of Comparative Example 3 prepared from Polymer 5 produced by polymerization of an allylic compound, which corresponds a compound of formula (I) in which X has a substituent (methyl group), was inferior in drying properties and also exhibited insufficient adhesion to polypropylene sheets (films).

The photocurable resin composition of Comparative Example 2 prepared from a combination of a diallyl phthalate resin and Polymer 5 could not be applied to a polypropylene sheet.

INDUSTRIAL APPLICABILITY

The photocurable resin composition of the present invention can be used in inks (e.g. offset inks), coating materials, adhesives, photoresists, and other applications for plastic substrates.

The invention claimed is:

1. A method, comprising:
applying a photocurable resin composition to a plastic substrate,
wherein the photocurable resin composition comprises an allylic polymer (A), the allylic polymer (A) being produced by polymerization of an allylic compound represented by the following formula (I):

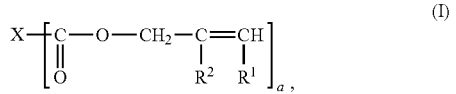
(I)

wherein $R^1$ and $R^2$ each represent H or $CH_3$; X represents an a-valent group having an unsubstituted saturated or partially unsaturated four- to eight-membered cyclic structure; and a represents 2 or 3; and
exposing the photocurable resin composition to light,
wherein the allylic polymer (A) is cured by the exposing to light.

2. The method according to claim 1,
wherein the X in formula (I) has any of the following cyclic structures:

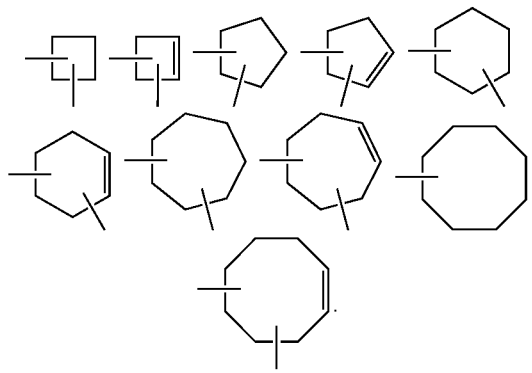

3. The method according to claim 1, wherein the photocurable resin composition further comprises an ethylenically unsaturated compound (B).

4. The method according to claim 1, wherein the photocurable resin composition further comprises a photopolymerization initiator.

* * * * *